United States Patent
Goldberg et al.

(10) Patent No.: US 10,019,403 B2
(45) Date of Patent: *Jul. 10, 2018

(54) MAPPING DATA LOCATIONS USING DATA TRANSMISSIONS

(71) Applicant: International Business Machines Corporation, Armonk, NY (US)

(72) Inventors: Itzhack Goldberg, Hadera (IL); Harry McGregor, Tucson, AZ (US); Christopher B. Moore, Vail, AZ (US); Gerhard H. Pieper, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 272 days.

This patent is subject to a terminal disclaimer.

(21) Appl. No.: 14/932,003

(22) Filed: Nov. 4, 2015

(65) Prior Publication Data

US 2017/0124012 A1 May 4, 2017

(51) Int. Cl.
*G06F 13/42* (2006.01)
*G06F 17/30* (2006.01)
*G06F 13/12* (2006.01)
*G06F 13/40* (2006.01)

(52) U.S. Cl.
CPC ........ *G06F 13/4282* (2013.01); *G06F 13/122* (2013.01); *G06F 13/404* (2013.01); *G06F 17/30884* (2013.01); *G06F 2201/87* (2013.01)

(58) Field of Classification Search
CPC ... G06F 13/4282; G06F 13/122; G06F 13/404
USPC ....................................................... 710/106
See application file for complete search history.

(56) References Cited

U.S. PATENT DOCUMENTS

| | | | |
|---|---|---|---|
| 6,073,225 A | 6/2000 | James et al. | |
| 6,763,446 B1 * | 7/2004 | Kemeny | G06F 3/0617 |
| | | | 707/999.202 |
| 6,876,656 B2 * | 4/2005 | Brewer | H04L 47/10 |
| | | | 370/236 |
| 8,793,429 B1 | 7/2014 | Call et al. | |
| 9,009,375 B2 | 4/2015 | Smith et al. | |
| 9,251,089 B2 * | 2/2016 | Gschwind | G06F 12/0292 |
| 9,734,256 B2 * | 8/2017 | Goldberg | G06F 17/30884 |

(Continued)

OTHER PUBLICATIONS

Accelerated Examination Support Document, U.S. Appl. No. 15/293,479, signed Oct. 1, 2016, 11 pgs.

(Continued)

*Primary Examiner* — Paul R Myers
(74) *Attorney, Agent, or Firm* — Jared L. Montanaro (57) ABSTRACT

A host sends an I/O transaction. The I/O transaction relates to a read or write operation for a first datum. A first listening service which manages I/O transactions for a first set of addresses receives the I/O transaction. The first listening service forwards the I/O transaction to a second listening service. The second listening service manages I/O transactions for a second set of addresses. The second listening service executes the I/O transaction at a selected address of the second set of addresses. The second listening service creates a data packet to respond to the I/O transaction. The header of the data packet includes the selected address. The second listening service transmits the data packet to the host. The host uses the selected address to update a database which includes addresses of data within.

20 Claims, 4 Drawing Sheets

(56) References Cited

U.S. PATENT DOCUMENTS

| | | |
|---|---|---|
| 2003/0002503 A1 | 1/2003 | Brewer et al. |
| 2005/0114728 A1* | 5/2005 | Aizawa ................ G06F 11/008 714/6.32 |
| 2007/0100994 A1 | 5/2007 | Armstrong et al. |
| 2009/0125632 A1 | 5/2009 | Purpura |
| 2009/0313503 A1* | 12/2009 | Atluri ................ G06F 11/1453 714/19 |
| 2010/0325474 A1 | 12/2010 | Gopinath et al. |
| 2014/0201562 A1 | 7/2014 | Breakstone et al. |
| 2014/0237186 A1 | 8/2014 | Cox et al. |
| 2015/0370702 A1* | 12/2015 | Voigt ................ G06F 17/30268 711/2 |
| 2016/0147446 A1 | 5/2016 | Ghosh |

OTHER PUBLICATIONS

Goldberg et al., "Mapping Data Locations Using Data Transmissions," U.S. Appl. No. 15/293,479, filed Oct. 14, 2016.
List of IBM Patents or Patent Applications Treated as Related, Oct. 11, 2016, 2 pgs.

* cited by examiner

MAPPING DATA LOCATIONS USING DATA TRANSMISSIONS

BACKGROUND

The present disclosure relates to computer systems, and more specifically, to managing data transmissions between a host and a storage system. An input/output (I/O) transaction coming from a host to a storage system may be intercepted by a listening service. Listening services may process the I/O transaction and then reply back to the host using a data packet. The reply data packets from listening services may include the data if the I/O transaction was a read, or a confirmation if the I/O transaction was a write.

SUMMARY

Aspects of the disclosure include a system, a method, and a computer program product transmitting data packets. A host may send an I/O transaction to a storage system. The I/O transaction may relate to a read or write operation regarding a first datum. The host may use a data map of locations to within the storage system to determine a first location of the first datum. A first listening service of the storage system may receive the I/O transaction. The first listening service may be at the first location. The first listening service may manage I/O transactions for a first set of addresses of the storage system. The first listening service may forward the I/O transaction to a second listening service. The second listening service may manage I/O transactions for a second set of addresses of the storage system. The second listening service may execute the I/O transaction at a selected address of the second set of addresses. The second listening service may create a data packet to respond to the I/O transaction. The header of the data packet may include the selected address. The second listening service may transmit the data packet to the host. The host may update the data map which includes location of data within the storage device. The host may update the database with the selected address.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure include a system and method for mapping data locations using data transmissions. A host may send input/output (I/O) transactions to storage systems. The storage systems may utilize listening services which process the I/O transactions. Each listening service may process I/O transactions for a different portion of a storage system. A host may maintain a record which details the addresses at which datums are kept within the storage systems. The host may use this record to identify a stored address of a datum, and may send an I/O transaction regarding said datum directly to the listening service which manages that stored address. Listening services may include the addresses of datums in the header of data packets sent back to the host to reply to the I/O transaction. Hosts may use the addresses to update the record of addresses. While the present disclosure is not necessarily limited to such applications, various aspects of the disclosure may be appreciated through a discussion of various examples using this context. Examples and example values discussed herein are provided by way of example only and are not to be construed as limiting.

Conventional storage computing networks may include a conventional host that sends I/O transactions to a set of conventional listening services on a conventional storage device. Each conventional listening services may process I/O transactions for a different portion of the conventional storage device. Some conventional hosts may keep a fully populated informational map which identifies where data is stored on the conventional storage system. In instances, the data may regularly migrate throughout the conventional storage device as the conventional storage system works to optimize space and data allocation. When the data migrates throughout the conventional storage system, the fully populated informational map of the conventional host may become out-of-date and therein incorrect. When a conventional host uses this incorrect fully populated informational map to transmit an I/O transaction to an incorrect location, performance may suffer and response times may increase as the conventional listening services forward the I/O transaction in the back-end process, attempting to find the correct conventional listening services. In other instances, a conventional host may receive periodic updates regarding current data locations throughout the conventional storage system to account for data migration. However, in such instances, the data may migrate more regularly than updates are sent, such that the fully populated informational map is often slightly out-of-date. In instances, maintenance on a fully populated data map through regular updates may require conventional hosts to use a relatively high amount of resources due to the number of data points in a fully populated data map Aspects of the present disclosure relate to listening services informing a host of the current location of data within a response data packet sent to the host. A listening service may send a response data packet to the host after every I/O transaction. The data packet may include the data and a header. The listening service may include the address within the header. The host may read the header and update a data map of locations of data within a storage device. If a host is not configured to update a fully populated informational map, the host may simply disregard the address, as data in the header of a data packet is not required to accept/process a data packet. By using existing data transmission structures to communicate addresses to a host in a manner which can be ignored by unconfigured hosts (e.g., hosts which do not use fully populated data maps), listening services may reduce unnecessary data transfer and improve storage system response time.

Figure 1:
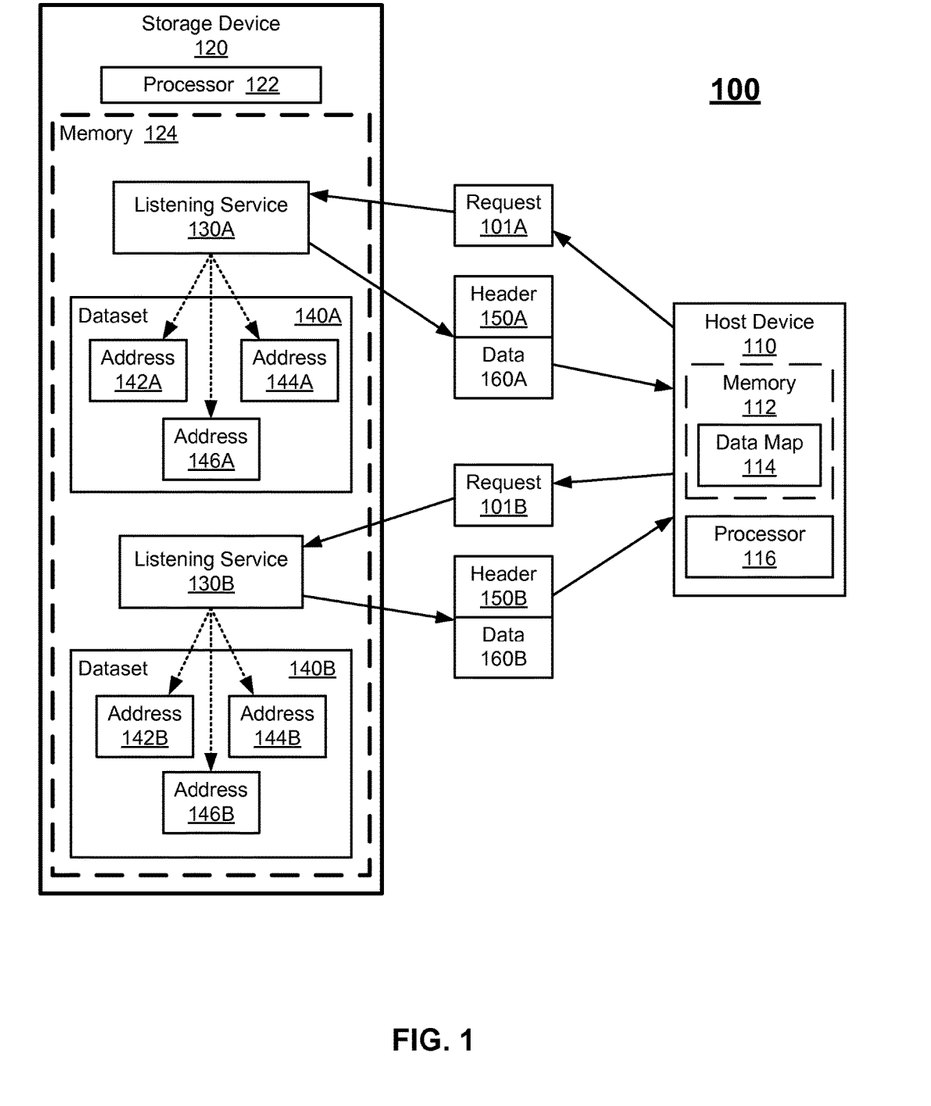
FIG. 1 depicts a block diagram of an example computing environment with a host and a plurality of storage systems, according to embodiments.

Referring now to FIG. 1, a block diagram of an example computing environment 100 for transmitting I/O transactions is depicted, according to embodiments of the present disclosure. In some embodiments, the computing environment 100 can include one or more storage devices 120 and one or more host devices 110. While FIG. 1 depicts an embodiment with one host device 110 and one storage device 120, other embodiments with more host devices 110 and more storage devices 120 are also possible. The storage device 120 and host device 110 can be geographically removed from each other and communicate over a network. In some embodiments, the storage device 120 and host device 110 communicate using small computer system interface (SCSI) protocol. In other embodiments, other protocols such as, but not limited to, serial advanced technology attachment (SATA) protocol or infiniBand protocol may be used to communicate over a network.

The host device 110 may include a memory 112 and a processor 116. The memory 112 may store applications whose instructions may be executed by the processor 116. These instructions may cause the processor 116 to execute at least one part of the functionality described below with respect to method 200. These applications may request that one or more datums be read from/written to a storage device 120. In response to these applications, the host device 110 may create a request 101. Where the request 101 relates to an existing datum (e.g., reading an existing datum, writing over an existing datum) the host device may reference a data map 114 which may be stored in the memory 112. The data map 114 may include an informational map of where datums are stored within a storage device 120. The host device 110 may identify a particular listening service 130 of a storage device 120 using the data map 114, and route the request 101 to this particular listening service 130.

In certain embodiments, the host 110 may use a data map 114 where the request 101 relates to a new datum. In these embodiments, the host 110 may identify an unused address which may improve the performance and health of the storage device 120 according to techniques known to one skilled in the art.

In some embodiments, the data map 114 may only include addresses of datums which the host device 110 has accessed. The data map 114 may only include these addresses due to the data map 144 exclusively being populated through headers 150 sent back from storage device 120. In other embodiments, a host 110 may request a complete data map 114 of all addresses upon being connected to a storage device 120, and in this way may be initialized with a fully populated data map. In certain embodiments, the host 110 may remove addresses from the data map 114 which have satisfied a time criterion. The time criterion may include the host 110 not using/accessing/referencing an address during a set period of time. For example, the time criterion may include thirty days. The host 110 may send a request 101 relating to a datum, and may receive an address of the datum within the header 150 of a return data packet. The host 110 may update the data map 114 with the address of the datum. If the host 110 does not identify the address of the datum within a thirty day window, the address may be removed from the data map 114. By removing unused addresses from a data map 114, a host 110 may have reduced memory and computational overhead needs. Other techniques for removing unused address from the data map 114 are also possible.

A storage device 120 may include a memory 124 and a processor 122. The processor 122 may execute instructions from operations stored on the memory 124, including operations from method 200 below. The memory 124 may include a plurality of listening services 130. The listening service 130 may initially process the request 101. Processing the request 101 may include executing the I/O transaction upon the datum at a location (e.g., set of addresses of the storage device 120) which is managed by the listening service 130. The listening service may then supply I/O transaction response (e.g., the datum for a read request 101, or a message communicating a successful write command for a write request 101) back to the host 110. The memory 124 may also include a plurality of datasets 140, wherein each listening service 130 manages a dataset 140. Listening services 130 may manage datasets 140 by processing I/O transactions for datums of the datasets 140. Datasets 140 may include datums at a plurality of addresses 142, 144, 146. As understood by one of skill in the art, each listening service 130 is inherently aware of all data at the addresses 142, 144, 146 which said listening service 130 manages over.

As an example, a host device 110 may create a read request for a first datum. The host device 110 may use the data map 114 to determine that the first datum is at address 142B within a dataset 140B which is managed by a listening service 130B of a storage device 120. The host device 110 may send the request 101B regarding this I/O transaction to the first listening service 130B. The listening service 130B may identify the first datum as existing within its dataset 140B, though actually residing at address 144B. The listening service 130B may create a data packet to send back to the host 110. The data packet may include the first datum as data 160 and the current address 144B in the header 150. The host device 110 may update the data map 114 with the current address 144B.

As another example, the host device 110 may create a write request for a second datum, which the host device 110 may determine is located at address 146A of the storage device 120 using the data map 114. The host device 110 may send the new request 101A to a listening service 130A which processes requests for address 146A. The listening service 130A may determine that address 146A is the correct address, write over the datum in address 146A using the request 101A, and send a response data packet to the host 110. The data packet may include write details in the data 160A and the address 146A of the datum in the header. By including address updates in existing communication rather than sending updates within extra communication (e.g., a second data packet which exclusively informs the host 110 of the address), listening services 130 may improve bandwidth of the computing environment 100 by reducing extra transmissions.

Consistent with various embodiments, the host device 110 and storage device 120 may each be computer systems, and may each be equipped with a display or monitor. The computer systems may include at least internal or external network interface or communications devices (e.g., modem, network interface cards), optional input devices (e.g., a keyboard, mouse, touchscreen, or other input device), and commercially available or custom software (e.g., browser software, communications software, server software, natural language processing software, search engine and/or web crawling software, filter modules for filtering content based upon predefined criteria). The computer systems may include servers, desktops, laptops, and hand-held devices.

Figure 2:
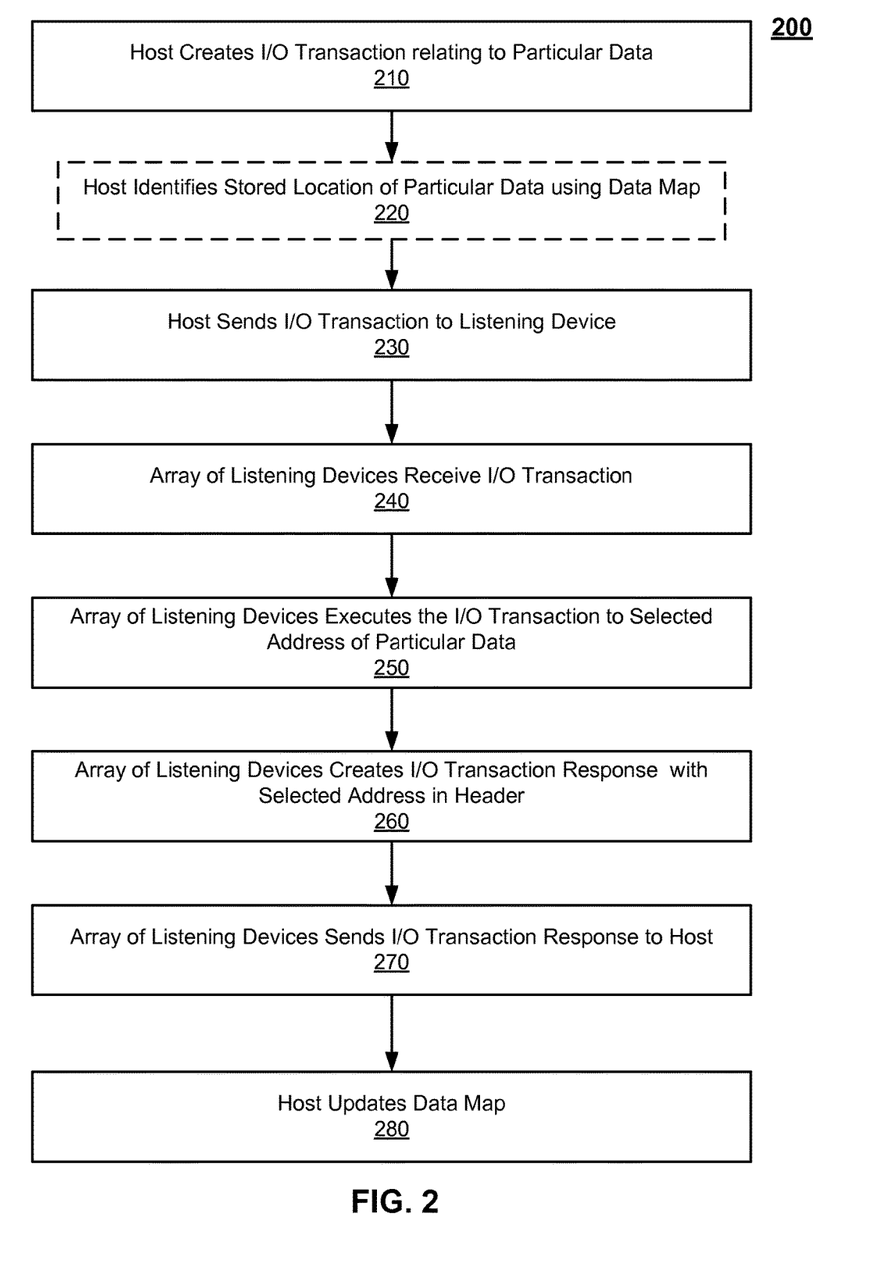
FIG. 2 depicts a method of transmitting data packets, according to embodiments.

FIG. 2 is a flowchart illustrating a method 200 for mapping data locations using data transmissions. Method 200 may include one or more host computing system (hereinafter referred to as hosts), which may be similar to the host device 110 of FIG. 1. The host may send an I/O transaction to a storage computing system (hereinafter referred to as a storage device), which may be equivalent to the storage device 120 of FIG. 2. In some embodiments, the host and storage device may communicate using SCSI protocol. In other embodiments, other protocols such as, but not limited to, SATA protocol or infiniBand protocol, may be used to communicate between the host and storage device. Blocks with hashed lines in FIG. 2 may be optional steps within method 200. The visual arrangement of blocks in the flowchart of FIG. 2 is not to be construed as limiting the order in which the individual acts/operations may be performed, as certain embodiments may perform the operations of FIG. 2 in alternative orders.

At block 210 the host creates an I/O transaction relating to one or more datums. The I/O transaction may include reading one or more existing datums, writing over existing datums, or writing new datums. The I/O transaction may be similar to the requests 101 of FIG. 1. In some embodiments, the host may have access to a data map of the storage system. The data map may include a list of locations at which datums are stored. A host may increase response time and performance by sending an I/O transaction directly to a location which holds datums of the I/O transaction.

In certain embodiments, all datums of a storage device may be included in a data map. In other embodiments, only frequently accessed/referenced datums of the storage device may be included in the data map. The host may maintain a data map, such that infrequently referenced addresses of the data map are deleted as described herein.

Where the host has access to such a data map, at block 220 the host may identify a location at which to send the I/O transaction. The host may identify the location where the I/O transaction relates to existing datums. Where the I/O transaction includes existing datums, the location may be the address of the existing datums. In some embodiments, the host may only use a data map to direct an I/O transaction when the I/O transaction is regarding existing datums. In other embodiments, the host may also use a data map to direct an I/O transaction to an unused address for new datums (e.g., for a write request for a new datum).

At block 230 the host sends the I/O transaction to the storage device. Where the host has access to a data map which includes an address of the I/O transaction, the host may send the I/O transaction to a location of the datums as described herein. In other embodiments, the host may not have access to a data map which includes a location of the datum (e.g., where the data map is being constructed or the datum is new). In such embodiments, the host may use round-robin pathing techniques known to one skilled in the art to determine a location. Put differently, a host which does not have access to a data map which includes an address relating to the datum of the I/O transaction may instead alternate equally between the listening services of the storage device. For example, if a host does not use a data map and a storage device includes ten listening services, after ten I/O transactions the host may have directed one I/O transactions to each listening service, while after twenty I/O transaction the host may have directed two I/O transactions to each listening service, and so on. In other embodiments, a host device may instead use active/failover techniques known to one skilled in the art or most-recently-used-pathing techniques known to one skilled in the art to transmit I/O transactions which regard datums of unknown locations. Other ways of transmitting I/O transactions to listening services without a data map are also possible.

At block 240 a listening service receives the I/O transaction. In some embodiments, the listening service may be a controller which processes I/O transactions for the storage device. Where the host and storage device communicate using SCSI the listening service may be a target, or target service, of the host. For example, an IBM XIV storage device target service may be provided by the interface service. A storage device may include any number of listening services. Each listening service of a storage device may manage a separate set of addresses of the storage device. In some embodiments, every address of a storage device may be managed by one and only one listening service.

At block 250 a listening service may execute the I/O transaction. The listening service may execute the I/O transaction at a selected address. Where the I/O transaction relates to existing data (e.g., writing over or reading existing data), the selected address may be the address of the existing data. Where the I/O transaction relates to new data, the selected address may an address as determined by the storage device. The storage device may determine this address using techniques known to one skilled in the art to improve placement of data and health of the storage device. In other embodiments, the host may suggest an address at which to locate the new datum. In this way data placement within the storage device may be improved without the need for the storage device to intervene.

In some instances, the listening service which receives the I/O transaction may execute the I/O transaction. As understood by one skilled in the art, a listening service is inherently aware of data stored within addresses managed by said listening service, allowing listening services to determine whether they can independently execute I/O transactions. For example, a host at 220 may determine a stored location of an existing datum for an I/O transaction, and the host may send a request for the I/O transaction to a first listening service at block 230. At block 240 the first listening service may receive the request, determine that the datum of the I/O transaction is managed by itself, and at block 250 the first listening service may execute the I/O transaction at the stored location. The first listening service may both receive and execute the I/O transaction as a result of the data map being correct. In other embodiments, a host may randomly cycle through listening services, and a listening service may receive the I/O transaction through pure chance (e.g., a host sending a request to a storage system with ten listening services has a one-in-ten chance of sending the request to the "correct" listening service, granted that each listening service manages an equal amount of addresses/datums).

In other instances, a listening service may require the assistance of a second listening service to execute the I/O transaction. Listening services may have an inherent ability to service I/O transactions which do not pertain to data stored within addresses managed by themselves. As understood by one of skill in the art, listening services are inherently aware of the datums managed by other listening services. As such, servicing I/O requests of other listening services may include a first listening service forwarding the I/O transaction to a second listening service which holds the data. The second listening service may then execute the I/O transaction, and send any data of the I/O transaction (e.g., the datums of the I/O transaction for a read request, or write details for a write request) back to the first listening service.

At block 260 a listening service creates an I/O transaction response. The transaction response may include the selected address within the transaction response. In some embodiments, the selected address may be located within the header of the transaction response. As used herein, the selected address is the address at which the I/O transaction was executed. The I/O transaction response may be a data packet which includes data on the I/O transaction for the host. For example, where the I/O transaction includes a read request of a datum, the I/O transaction response may include a data packet where the data is the requested datum. For another example, where the I/O transaction includes a write request over an existing datum, the I/O transaction response may include a notification that the write was successful or unsuccessful.

In some embodiments, a first listening service which received the I/O transaction may create the I/O transaction response, even if a second listening service executed the I/O transaction. In such embodiments where a listening service does not execute the I/O transaction yet still creates the I/O transaction, the executing listening service may send execution details to the creating listening service. In other embodiments, the first listening service may request that the second listening service create the I/O transaction response.

The listening service may create the I/O transaction response as a data packet with the selected address in the header of the data packet. By locating the selected address in the header, a host which is not configured to utilize a data map yet still receives an I/O transaction response with an address in the header may disregard the address. However, in certain embodiments, a listening service may locate the selected address in a different portion of a data packet, such as the body of a data packet.

In some embodiments, the listening service may include the selected address in the header in response to an I/O transaction relating to new (rather than existing) data, or in response to the host using a data map which includes an incorrect address. A listening service may identify that the host may be utilizing a data map with an incorrect address by detecting that the host sent an I/O transaction for an existing datum to an incorrect location, or other such suboptimal operations. In such embodiments, where the I/O transaction related to existing data sent to the correct address, or where the storage device communicates with a plurality of hosts wherein some hosts do not utilize a data map, the listening service may not include the selected address in the header in every instance. In this way, a listening service may only include the address when the information is necessary (e.g., where a host is using an incorrect data map), which may reduce unnecessary operations and communication over the network. Put differently, in some embodiments, a listening service may refrain from including the selected address in a header where the I/O transaction comes in properly (e.g., the I/O transaction is received by the listening service which manages the datum of the I/O transaction) or where the host was recently informed of the selected address.

In certain embodiments, the functionality of including the address within the header may be disabled for instances. This functionality may be disabled per host or per volume (e.g., volume of the storage device). The functionality may be disabled where the storage device communicates with a plurality of hosts, and at least one of those hosts is not configured to use a data map, in order to reduce processing time of the listening service when communicating with said host.

At block 270 a listening service sends the I/O transaction response to the host. The listening service which sends the I/O transaction response may be the listening service which received the initial request from the host in block 240. In other embodiments, the second listening service which held the datum of the I/O transaction may respond to the host with a specific SCSI header identifying itself as the location where the datum is located.

At block 280 the host receives the I/O transaction response and update the data map. Where the host is configured to dynamically update a data map with addresses of datums, the host may pull the selected address from the header and update the data map. In some embodiments, the host may only update the data map when the address of the header is different than the stored address of the data map. Where the host is not configured to dynamically update a data map, the host may disregard the contents of the header. By updating the data map through actual I/O transactions, the data map may maintain accurate and up-to-the-minute data on those addresses which are most often being referenced, which in some embodiments may be the most addresses to have accurate (e.g., as their non-accuracy may lead to the largest amount of back-end redirection given their high volume of activity).

In some embodiments, the host may undergo maintenance procedures to minimize the size of the data map. In certain embodiments this may include the data map only including addresses of datums which the host device has accessed (e.g., not including the addresses of datums which the host has never referenced in an I/O transaction). In other embodiments the host may request an initial data map from the storage device which includes a fully-populated map of all datums within the storage device. In some embodiments, the host may periodically remove entries which have been underutilized. An underutilized entry may include an address which has not been accessed by the host in a certain period of time, or an address which has been accessed less than a threshold number of times during a certain time window. For example, a host may remove an address which has been accessed less than five times within a thirty day window. The host may analyze a data map in set intervals (e.g., once a day, once a week, etc.) and remove any records which have not been accessed within the previous thirty days, for example. In this way, locations of the data map which are not frequently accessed may be configured to "time out" to preserve memory. Removing underutilized addresses may reduce the probability of the map growing to an unmanageable size. Other techniques for removing unused/underused address from the data map are also possible.

Figure 3:
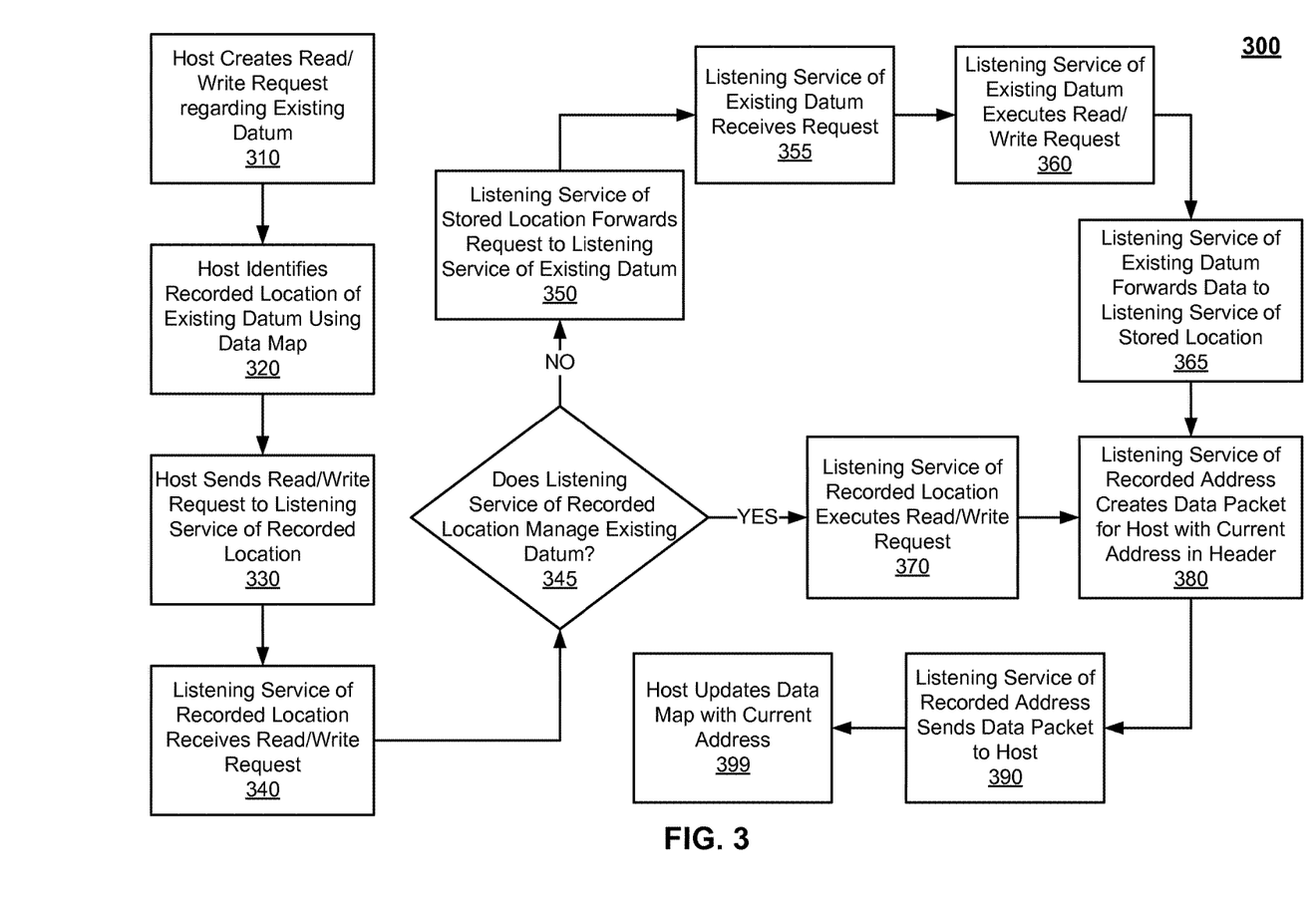
FIG. 3 depicts a flowchart of processing I/O transactions for existing data, according to embodiments.

FIG. 3 is a flowchart 300 illustrating a flow of transmitting data packets. The flowchart 300 may be an embodiment of the method 200 of mapping data using data transmissions. At 310 a host creates a request for an existing datum. This request may be a read request or a write request. At 320 the host identifies a location of the existing datum. The location may be an address within a storage device as described herein. The location may be identified with a data map, which records where existing datums have been located. At 330 the host sends the request to the location. Sending the request to the location may include sending the request to a listening service as described herein.

At 340 the listening service receives the request. The listening service may manage datums which reside in a first set of addresses, and at 345 the listening service may determine whether or not the request relates to a datum which is in the first set of addresses. In some instances, the existing datum of the request may reside in the first set of addresses. In such instances, at 370 the first listening service may execute the request. At block 380, the first listening service may then create a data packet which responds to the I/O transaction. The responding data packet may include the address at which the request was executed. The first listening service may include this address within the header of the data packet.

In some instances, the existing datum of the request may not be in the first set of addresses. In such instances, at 350 the listening service may forward the request to a second listening service. The second listening service may manage I/O transactions for a second set of addresses, and the existing datum of the request may reside in the second set of addresses. Put differently, in this example where the request is forwarded, the data map of the host from 320 may have been wrong (e.g., the data map was previously correct but has not been updated since the data map was migrated, or the data map was never correct and has never been corrected). At 355 the second listening service may receive the request. At 360 the second listening service which manages the existing datum may execute the request, and at 365 the second listening service may forward data to the first listening service. The data may include the address at which the request was executed and other details of the request execution as described herein. The first listening may then receive this data, and may create the response data packet at 380 as described herein.

At 390 the first listening service may send the data packet to the host. The host may then receive the data packet and update the data map at block 399. Where the host had incorrect data within the data map (e.g., where the first listening service determined "no" at 345), the data map may change to reflect the new address within the header of the data packet.

Figure 4:
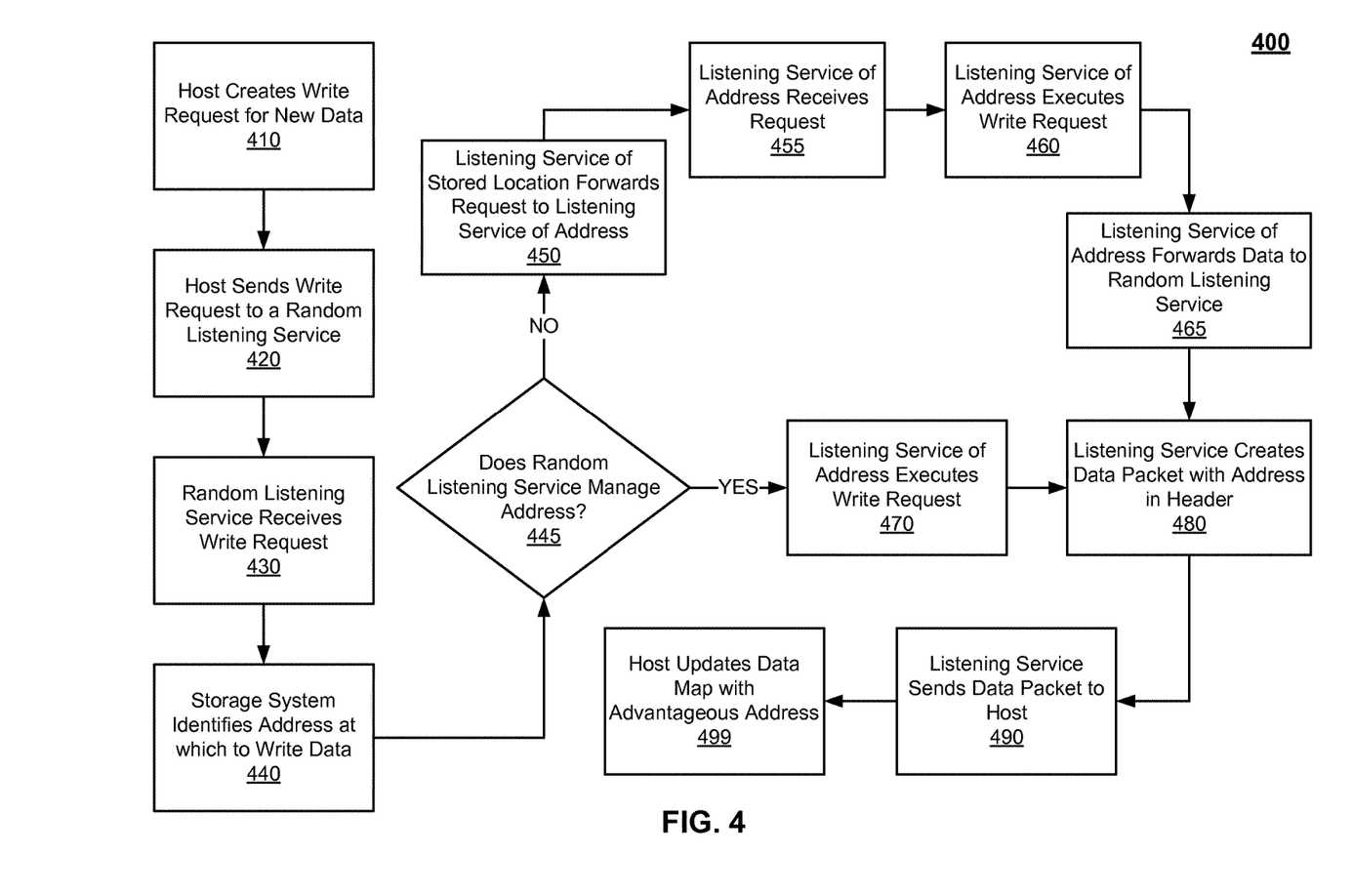
FIG. 4 depicts a flowchart of processing I/O transactions for new data, according to embodiments.

FIG. 4 is a flowchart 400 illustrating a flow of transmitting data packets. The flowchart 400 may be an embodiment of the method 200 of mapping data using data transmissions. At 410 a host creates a request for writing a new datum. At 420 the host sends the request to a storage device as described herein. The host may send the request to a random listening service of the storage device. The listening service may be random due to the host cycling through listening services as described herein (e.g., where the host does not yet have a location relating to the request stored within a data map).

At 430 a first listening service receives the request through the random cycle. The listening service may manage a first set of addresses. At 440 the storage device may determine an address at which to locate the new datum. The storage device may use techniques known to one skilled in the art to determine the address. Alternatively, the host may use a data map to suggest a location within the storage device. In some embodiments, the storage device may follow any such suggestion of a host, provided that the suggested location is currently unoccupied. By allowing a host to suggest locations, a storage device may see increased performance. At 445 the first listening service may determine whether the first set of addresses includes the address. In some instances, the first set of addresses will include the address. In such instances, at 470 the first listening service may execute the write request. At block 480, the first listening service may then create a data packet which responds to the I/O transaction. The responding data packet may include the address. The first listening service may include the address within the header of the data packet.

In some instances, the first set of addresses will not include the address. In such instances, at 450 the first listening service may forward the request to a second listening service. The second listening service may manage I/O transactions for a second set of addresses which includes the address. At 455 the second listening service may receive the request. At 460 the second listening service may execute the write request, and at 465 the second listening service may forward data to the first listening service. The first listening may then receive this data, and may create the response data packet at 480 as described herein.

At 490 the first listening service may send the reply data packet to the host. The host may then receive the data packet and update the data map with the address at block 499. Being as the request related to new data, the data map may be amended to include a new entry which includes the new datum and the address.

The functionality outlined in the discussions herein regarding FIG. 1, FIG. 2, FIG. 3, and FIG. 4 above can be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in the computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of mapping data addresses, the method comprising:
   creating, by a host that utilizes a database of addresses of data, a first input/output (I/O) transaction, wherein the first I/O transaction is a read or write request related to a first datum;
   transmitting, by the host, the first I/O transaction to a first listening service;
   receiving, by the first listening service, the first I/O transaction, wherein the first listening service manages I/O transactions for a first set of addresses,
   forwarding, by the first listening service, the first I/O transaction to a second listening service that manages I/O transactions for a second set of addresses;
   executing, by the second listening service, the first I/O transaction at a selected address of the second set of addresses, wherein the selected address relates to the first datum;
   creating a first data packet to respond to the first I/O transaction, wherein a header of the first data packet includes the selected address;
   transmitting, by the first listening service, the first data packet to the host; and
   updating, by the host, the databases of addresses with the selected address.

2. The method of claim 1, wherein the first data packet is transmitted to the host using small computer system interface (SCSI) protocol.

3. The method of claim 1, wherein transmitting the first I/O transaction to the first listening service includes using the database of addresses to determine an address of the first datum, wherein the address is included in the first set of addresses.

4. The method of claim 3, wherein the host is configured to use the database of addresses to identify the selected address of the first datum for a second I/O transaction.

5. The method of claim 4, further comprising:
receiving the second I/O transaction by the second listening service, wherein the second I/O transaction is a read or write request from the host related to the first datum;
executing, by the second listening service, the second I/O transaction at the selected address, wherein the selected address relates to the first datum;
creating, by the second listening service, a second data packet to respond to the second I/O transaction, wherein a header of the second data packet includes the selected address; and
transmitting, by the second listening service, the second data packet to the host.

6. The method of claim 1, further comprising:
forwarding, by the second listening service, data of the execution of the first I/O transaction at the selected address to the first listening service; and
creating the first data packet via the first listening service.

7. The method of claim 1, wherein the host is configured to maintain a data map by removing underutilized addresses of the data map.

8. A system, comprising:
a processor; and
a memory coupled to the processor, wherein the memory comprises instructions which, when executed by the processor, cause the processor to:
create, by a host that utilizes a database of addresses of data, a first input/output (I/O) transaction, wherein the first I/O transaction is a read or write request related to a first datum;
transmit, by the host, the first I/O transaction to a first listening service;
receive, by the first listening service, the first I/O transaction, wherein the first listening service manages I/O transactions for a first set of addresses,
forward, by the first listening service, the first I/O transaction to a second listening service that manages I/O transactions for a second set of addresses;
execute, by the second listening service, the first I/O transaction at a selected address of the second set of addresses, wherein the selected address relates to the first datum;
create a first data packet to respond to the first I/O transaction, wherein a header of the first data packet includes the selected address;
transmit, by the first listening service, the first data packet to the host; and
update, by the host, the databases of addresses with the selected address.

9. The system of claim 8, wherein the first data packet is transmitted to the host using SCSI protocol.

10. The system of claim 8, wherein transmitting the first I/O transaction to the first listening service includes using the database of addresses to determine an address of the first datum, wherein the address is included in the first set of addresses.

11. The system of claim 10, wherein the host is configured to use the database of addresses to identify the selected address of the first datum for a second I/O transaction relating to the first datum.

12. The system of claim 11, wherein the memory further comprises instructions which, when executed by the processor, cause the processor to:
receive the second I/O transaction by the second listening service, wherein the second I/O transaction is a read or write request from the host related to the first datum;
execute, by the second listening service, the second I/O transaction at the selected address, wherein the selected address relates to the first datum;
create, by the second listening service, a second data packet to respond to the second I/O transaction, wherein a header of the second data packet includes the selected address; and
transmit, by the second listening service, the second data packet to the host.

13. The system of claim 8, wherein the memory further comprises instructions which, when executed by the processor, cause the processor to:
forward, by the second listening service, data of the execution of the first I/O transaction at the selected address to the first listening service; and
create the first data packet via the first listening service.

14. The system of claim 8, wherein the host is configured to maintain a data map by removing underutilized addresses of the data map.

15. A computer program product for transmitting data packets, the computer program product disposed upon a computer readable storage medium, the computer program product comprising computer program instructions that, when executed by a computer processor of a computer, cause the computer to:
create, by a host that utilizes a database of addresses of data, a first input/output (I/O) transaction, wherein the first I/O transaction is a read or write request related to a first datum;
transmit, by the host, the first I/O transaction to a first listening service;
receive, by the first listening service, the first I/O transaction, wherein the first listening service manages I/O transactions for a first set of addresses of the storage device,
forward, by the first listening service, the first I/O transaction to a second listening service that manages I/O transactions for a second set of addresses;
execute, by the second listening service, the first I/O transaction at a selected address of the second set of addresses, wherein the selected address relates to the first datum;
create a first data packet to respond to the first I/O transaction, wherein a header of the first data packet includes the selected address;
transmit, by the first listening service, the first data packet to the host; and
update, by the host, the databases of addresses with the selected address.

16. The computer program product of claim 15, wherein the first data packet is transmitted to the host using SCSI protocol.

17. The computer program product of claim 15, wherein the computer program product further comprising computer program instructions that, when executed by a computer processor of a computer, cause the computer to transmit the first I/O transaction to the first listening service by:
using the database of addresses to determine an address of the first datum, wherein the address is included in the first set of addresses.

18. The computer program product of claim 17, wherein the host is configured to use the database of addresses to identify the selected address of the first datum for a second I/O transaction.

19. The computer program product of claim 15, wherein the computer program product further comprising computer program instructions that, when executed by a computer processor of a computer, cause the computer to:
   forward, by the second listening service, data of the execution of the first I/O transaction at the selected address to the first listening service; and
   create the first data packet via the first listening service.

20. The computer program product of claim 15, wherein the host is configured to maintain a data map by removing underutilized addresses of the data map.

* * * * *